US012773948B2

(12) United States Patent
Inui et al.

(10) Patent No.: US 12,773,948 B2
(45) Date of Patent: Oct. 27, 2026

(54) DRIVING SUPPORT DEVICE

(71) Applicants: AISIN CORPORATION, Kariya (JP); HONDA MOTOR CO., LTD., Tokyo (JP)

(72) Inventors: Yoji Inui, Kariya (JP); Masaki Furukawa, Kariya (JP); Norio Imai, Kariya (JP); Kazuya Kobayashi, Tokyo-to (JP)

(73) Assignees: AISIN CORPORATION, Kariya (JP); HONDA MOTOR CO., LTD., Tokyo (JP)

( * ) Notice: Subject to any disclaimer, the term of this patent is extended or adjusted under 35 U.S.C. 154(b) by 303 days.

(21) Appl. No.: 18/398,617

(22) Filed: Dec. 28, 2023

(65) Prior Publication Data

US 2024/0227675 A1 Jul. 11, 2024

(30) Foreign Application Priority Data

Jan. 11, 2023 (JP) ................................ 2023-002250

(51) Int. Cl.

| | |
|---|---|
| ***G02B 5/08*** | (2006.01) |
| ***B60R 1/072*** | (2006.01) |
| ***B60R 1/074*** | (2006.01) |
| ***B60W 30/06*** | (2006.01) |
| ***B60W 40/105*** | (2012.01) |
| ***B60W 50/00*** | (2006.01) |

(52) U.S. Cl.

CPC .............. *B60R 1/074* (2013.01); *B60R 1/072* (2013.01); *B60W 30/06* (2013.01); *B60W 40/105* (2013.01); *B60W 50/0097* (2013.01)

(58) Field of Classification Search

CPC ........ B60R 1/074; B60R 1/072; B60W 30/06; B60W 40/105; B60W 50/0097; B62D 15/0285; B62D 15/027

See application file for complete search history.

(56) References Cited

U.S. PATENT DOCUMENTS

2022/0099829 A1* 3/2022 Brown ...................... G01S 5/20
2022/0203896 A1* 6/2022 Choi ....................... B60R 1/062

FOREIGN PATENT DOCUMENTS

JP 2022042212 A 3/2022
KR 102316713 B1 10/2021

OTHER PUBLICATIONS

Extended European Search Report issued on May 29, 2024, in corresponding European Patent Application No. 24150143.6. (9 pages).

* cited by examiner

*Primary Examiner* — Euncha P Cherry

(74) *Attorney, Agent, or Firm* — BUCHANAN INGERSOLL & ROONEY PC

(57) ABSTRACT

A driving support device of an embodiment is a driving support device that performs, based on surrounding information collected by a plurality of sensors provided in a vehicle, parking support for the vehicle. When the parking support is performed, a calculation module starts, when a width of a frontage of a parking area for the vehicle to enter the parking area is a certain threshold or less, closing of rear side checking parts by an opening-and-closing control unit at a position in front of the parking area based on the vehicle, the position being based on a distance obtained from a vehicle speed of the vehicle and a time required to close the rear side checking parts.

6 Claims, 8 Drawing Sheets

DRIVING SUPPORT DEVICE

CROSS-REFERENCE TO RELATED APPLICATIONS

This application is based upon and claims the benefit of priority from Japanese Patent Application No. 2023-002250, filed on Jan. 11, 2023; the entire contents of which are incorporated herein by reference.

FIELD

Embodiments described herein relate generally to a driving support device.

BACKGROUND

There is a driving support device that automatically performs parking of a vehicle in a parking area. When the parking area has a narrow frontage, checking parts of a rear side such as side mirrors of the vehicle may interfere with other vehicles etc. parked nearby. For example, in the technology of Japanese Patent Application Laid-open No. 2022-042212, when the frontage width of the parking area falls below a certain threshold, the side mirrors are closed at a time point at which an entry route to the parking area becomes a straight route in the final stage of parking.

However, in the technology of Japanese Patent Application Laid-open No. 2022-042212, because closing of the side mirrors is started in the final stage of parking, the side mirrors may be in contact with other vehicles or the like before the side mirrors are fully closed. In parking support involving route correction or the like, the route to the parking area is not necessarily a straight route, and it is assumed that there will be many situations to which the technology of Japanese Patent Application Laid-open No. 2022-042212 cannot be applied.

The present invention has been made in view of the above, and provides a driving support device that can safely close rear side checking parts while preventing contact with neighboring vehicles or the like.

SUMMARY

To solve the problem described above and achieve the object, a driving support device according to one embodiment performs, based on surrounding information collected by a plurality of sensors provided in a vehicle, parking support for the vehicle. The driving support device includes an opening-and-closing control unit configured to open and close rear side checking parts provided with first sensors out of the plurality of sensors; and a calculation module, when the parking support is performed, configured to determine whether the rear side checking parts are closed based on a size of a width of a frontage of a parking area for the vehicle to enter the parking area. The calculation module, when the width of the frontage is a certain threshold or less, is configured to start closing of the rear side checking parts by the opening-and-closing control unit at a position in front of the parking area based on the vehicle, the position being based on a distance obtained from a vehicle speed of the vehicle and a time required to close the rear side checking parts.

According to this configuration, the rear side checking parts can be safely closed while preventing approach to neighboring vehicles or the like.

DETAILED DESCRIPTION

Similar components of the following exemplary embodiment and the like will be denoted by common symbols, and duplicate descriptions will be omitted as appropriate.

Configuration Example of Vehicle

Figure 1:
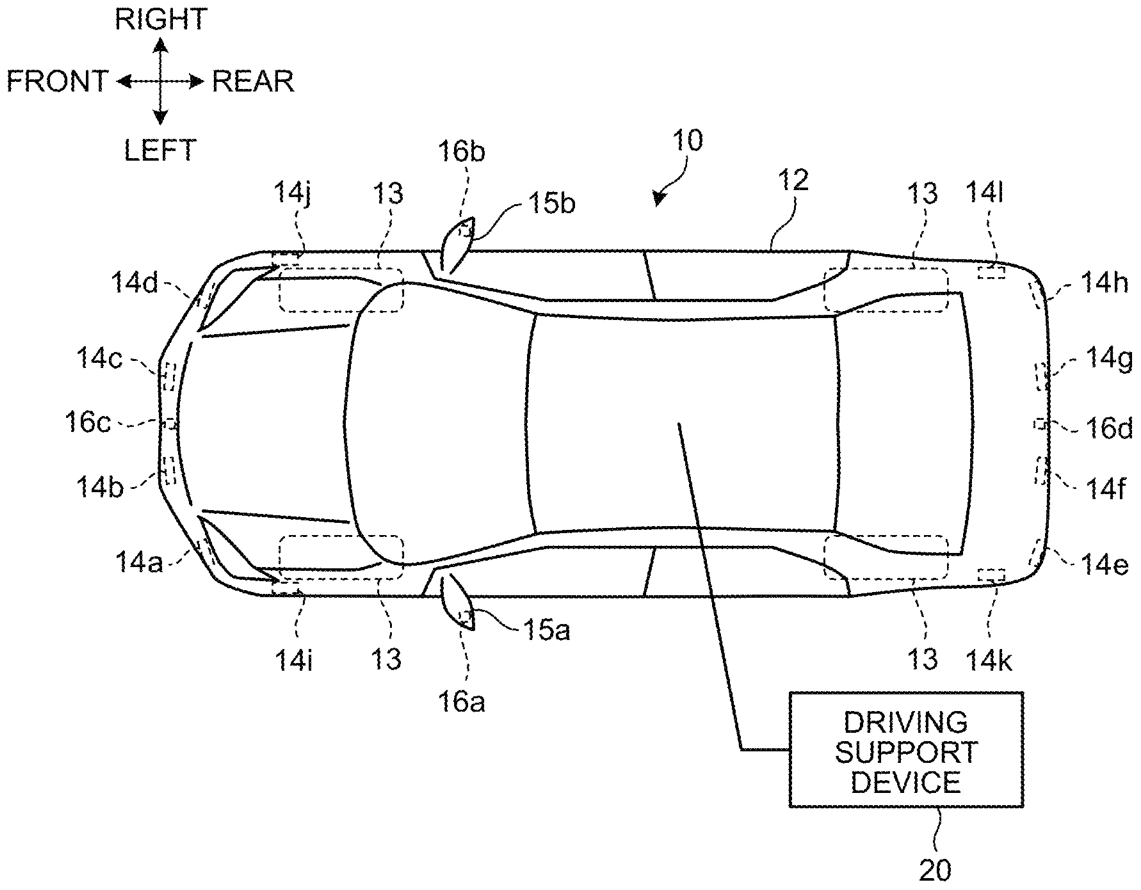
FIG. 1 is a top view of a vehicle installed with a driving support device according to an embodiment.

FIG. 1 is a top view of a vehicle 10 installed with a driving support device 20 according to the embodiment. Front, rear, left, and right of the vehicle 10 in FIG. 1 indicate directions as viewed from a driver's seat of the vehicle 10.

The vehicle 10 of the embodiment may be, for example, an internal combustion engine vehicle driven with an internal combustion engine as a driving source, an electric vehicle or fuel cell vehicle with an electric motor as a driving source, or a hybrid vehicle with both of them as driving sources.

The vehicle 10 can be installed with various speed changing apparatuses and can be installed with apparatuses such as various systems and components necessary for driving the internal combustion engine or the electric motor. The system, number, layout, and the like of the apparatuses involved in wheels 13 of the vehicle 10 can be set in various ways.

As illustrated in FIG. 1, the vehicle 10 includes a vehicle body 12, a plurality of wheels 13, a pair of side mirrors **15*a* and 15*b*, a plurality of distance measuring units 14*a* to 14*l*, and a plurality of imaging units 16*a* to 16*d*. When there is no need to distinguish the side mirrors 15*a* and 15*b* from each other, they are referred to simply as side mirrors 15. When there is no need to distinguish the distance measuring units 14***a* to 14*l* from each other, they are referred to simply as distance measuring units 14. When there is no need to distinguish the imaging units 16*a* to 16*d* from each other, they are referred to simply as imaging units 16.

The vehicle body 12 forms a vehicle cabin occupants get in. Mounted on the vehicle body 12 are the wheels 13, the side mirrors 15*a* and 15*b*, the distance measuring units 14, and the imaging units 16. In the example in FIG. 1, the vehicle body 12 includes four wheels 13, a pair of left and right side mirrors 15*a* and 15*b*, 12 distance measuring units 14, and four imaging units 16. However, any number of side mirrors 15, distance measuring units 14, and imaging units 16 are mounted on the vehicle body 12.

The side mirrors 15*a* and 15*b* as a pair of rear side checking parts are door mirrors or the like provided on respective left and right doors at the front of the vehicle body 12. Apart from the side mirrors 15*a* and 15*b*, which are door mirrors or the like, fender mirrors or the like may be provided at the front end of the vehicle body 12.

The four wheels 13 are provided at the front, rear, left, and right of the vehicle body 12. The two front wheels 13 function as, for example, steering wheels and the two rear wheels 13 function as, for example, drive wheels.

The distance measuring units 14 are sonars provided, for example, on the outer peripheral part of the vehicle 10, transmitting a sound wave such as an ultrasonic wave as a detection wave, and capturing the detection wave reflected by objects such as obstacles existing around the vehicle 10. The distance measuring units 14 may be radars transmitting a detection wave such as laser light or millimeter wave radars.

The distance measuring units 14 collect surrounding information, which is information on the area around the vehicle 10, and outputs it to the driving support device 20. The distance measuring units 14 collect, for example, a response time, which is a time from transmission of the detection wave to reception of the detection wave, as the surrounding information to identify the distance between the objects and the vehicle 10. The driving support device 20 can detect the presence or absence of obstacles or the like around the vehicle 10 and the distance to the obstacles based on the surrounding information collected by the distance measuring units 14.

When receiving a plurality of detection waves reflected by a plurality of parts of the object for one-time transmission of the detection wave, the distance measuring units 14 may include only the response time of the detection wave received earliest in the surrounding information.

The distance measuring units 14*a* to 14*d* are provided at the front of the vehicle body 12. Out of these distance measuring units 14*a* to 14*d*, the distance measuring units 14*b* and 14*c* are also called front sonars and are provided at the front end of the vehicle 10. The distance measuring units 14*b* and 14*c* detect the objects in front of the vehicle 10 to collect the surrounding information in front of the vehicle 10. The distance measuring units 14*a* and 14*d* are also called corner sonars and are provided at corners at the front of the vehicle 10. The distance measuring units 14*a* and 14*d* detect the objects in front of and outside the vehicle 10 to collect the surrounding information in front of and outside the vehicle 10.

The distance measuring units 14*e* to 14*h* are provided at the rear of the vehicle body 12. Out of these distance measuring units 14*e* to 14*h*, the distance measuring units 14*f* and 14*g* are also called rear sonars and are provided at the rear end of the vehicle 10. The distance measuring units 14*f* and 14*g* detect the objects in the rear of the vehicle 10 to collect the surrounding information in the rear of the vehicle 10. The distance measuring units 14*e* and 14*h* are also called corner sonars and are provided at corners at the rear of the vehicle 10. The distance measuring units 14*e* and 14*h* detect the objects in the rear of and outside the vehicle 10 to collect the surrounding information in the rear of and outside the vehicle 10.

The distance measuring units 14*i* to 14*l* are also called side sonars and are provided on sides of the vehicle body 12. Out of the distance measuring units 14*i* to 14*l*, the distance measuring units 14*i* and 14*j* are provided on the front sides of the vehicle 10. The distance measuring units 14*k* and 14*l* are provided on the rear sides of the vehicle 10. The distance measuring units 14*i* to 14*l* detect the objects on the sides of the vehicle 10 to collect the surrounding information on the sides of the vehicle 10.

The imaging units 16 as sensors are, for example, digital cameras with a built-in imaging sensor such as a charge coupled device (CCD) or a CMOS image sensor (CIS). The imaging units 16 generate moving or still taken images including a plurality of frame images taken at a certain frame rate.

The imaging units 16 are provided on the outer peripheral part of the vehicle body 12, each have a wide-angle lens or a fisheye lens, and can image a range of, for example, 140° to 190° in the horizontal direction. The optical axis of the imaging units 16 is set obliquely downward.

This causes the imaging units 16 to collect the surrounding information imaging the area around the vehicle 10, including a road surface, and outputs the surrounding information to the driving support device 20. The driving support device 20 can detect the presence or absence of the obstacles or the like around the vehicle 10 and the position of the obstacles based on the surrounding information collected by the imaging units 16. The driving support device 20 can detect parking areas around the vehicle 10 and the position of the parking areas based on the surrounding information collected by the imaging units 16.

The imaging unit 16*a* is provided at the central part of the left end of the vehicle body 12 in the front-rear direction, or for example, on the lower face of the left side mirror 15*a*. The imaging unit 16*a* collects a taken image of the area below and to the left of the vehicle 10 as the surrounding information. The imaging unit 16*b* is provided at the central part of the right end of the vehicle body 12 in the front-rear direction, or for example, on the lower face of the right side mirror 15*b*. The imaging unit 16*b* collects a taken image of the surroundings below and to the right of the vehicle 10 as the surrounding information. The imaging units 16*a* and 16*b* are examples of first sensors.

The imaging unit 16*c* is provided at the central part of the front end of the vehicle body 12 in the left-right direction, or for example, in a front bumper. The imaging unit 16*c* collects a taken image of the area in front of the vehicle 10 as the surrounding information. The imaging unit 16*d* is provided at the central part of the rear end of the vehicle body 12 in the left-right direction, or for example, in a rear bumper. The imaging unit 16*d* collects a taken image of the area in the rear of the vehicle 10 as the surrounding information. The imaging units 16*c* and 16*d* are examples of second sensors.

Configuration Example of Driving Support System

Figure 2:
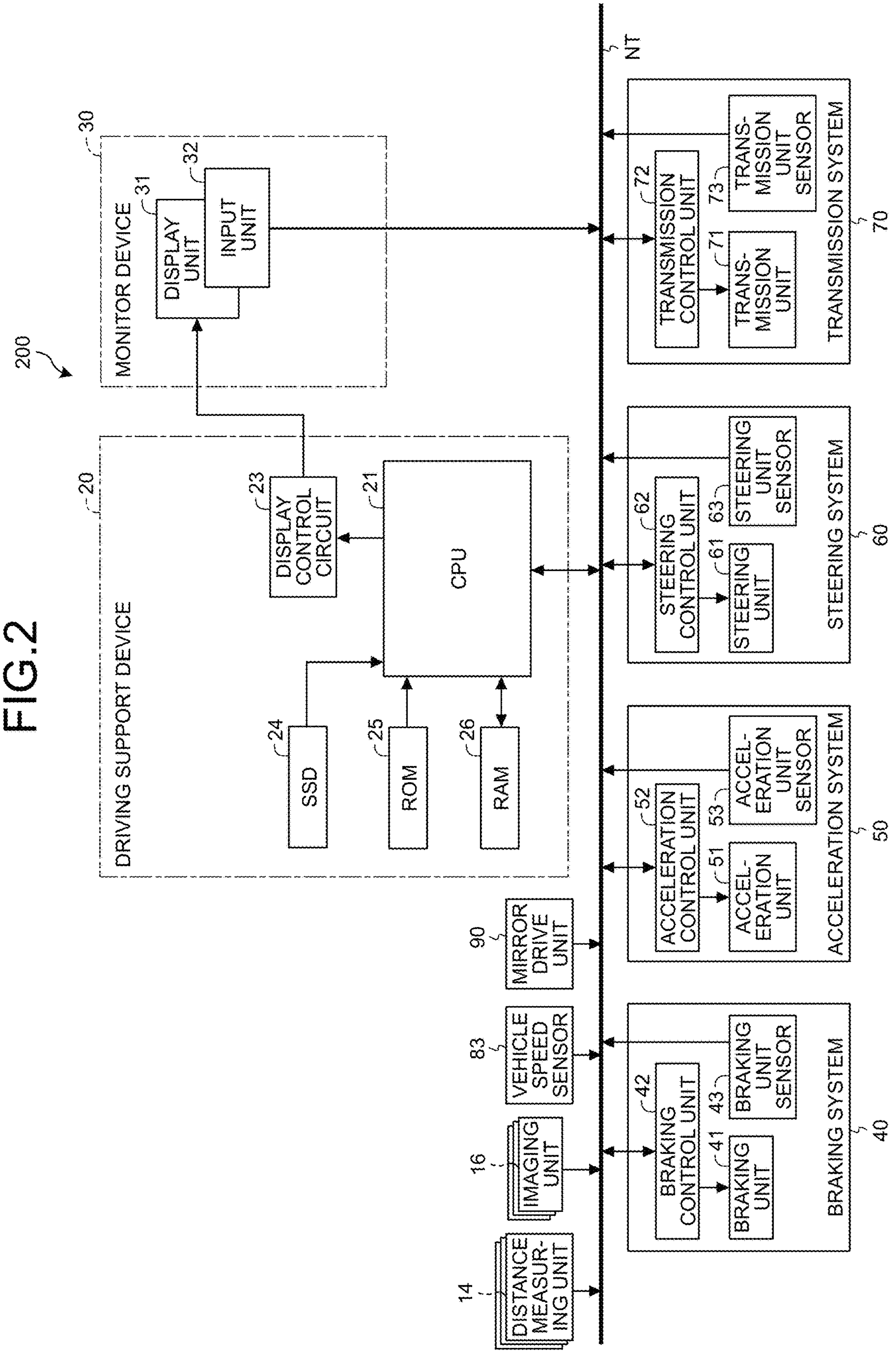
FIG. 2 is a block diagram of an example of an overall configuration of a driving support system according to the embodiment.

FIG. 2 is a block diagram of an example of an overall configuration of a driving support system 200 according to the embodiment. The driving support system 200 is installed in, for example, the vehicle 10 to remotely perform driving support such as causing the vehicle 10 to enter the parking area or to exit the parking area with the driver getting out of the vehicle 10.

As illustrated in FIG. 2, the driving support system 200 includes the driving support device 20, a monitor device 30, a braking system 40, an acceleration system 50, a steering system 60, a transmission system 70, a vehicle speed sensor 83, a mirror drive unit 90, the distance measuring unit 14, and the imaging unit 16. These components are connected to each other by an in-vehicle network NT in such a manner that they can mutually transmit and receive information.

The in-vehicle network NT includes, for example, Controller Area Network (CAN) and Local Interconnect Network (LIN). The in-vehicle network NT may be included as part of the driving support system 200.

The driving support device 20 is configured as a microcomputer such as an electronic control unit (ECU) and performs driving support for the vehicle 10.

The driving support device 20 includes a central processing unit (CPU) 21, a display control circuit 23, a solid state drive (SSD) 24, a read only memory (ROM) 25, and a random access memory (RAM) 26. The CPU 21, the ROM 25, and the RAM 26 may be integrated in the same package.

The CPU 21 is an example of a hardware processor and reads a computer program stored in a nonvolatile storage device such as the ROM 25 and executes various computing processing and control in accordance with this computer program.

The ROM 25 stores therein various computer programs and parameters required for execution of the computer programs. The RAM 26 temporarily stores therein various data for use in the computations by the CPU 21. The SSD 24 is a rewritable, nonvolatile storage device and maintains data even when the driving support device 20 is turned off.

The display control circuit 23 mainly executes, among the computing processing performed by the driving support device 20, image processing of images obtained by the imaging units 16 and data conversion of images for display to be displayed on a display unit 31 described below, which is included in the monitor device 30.

The braking system 40 includes a braking unit 41, a braking control unit 42, and a braking unit sensor 43 and controls the deceleration of the vehicle 10.

The braking unit 41 is an apparatus including, for example, a brake and a brake pedal and decelerates the vehicle 10. The braking control unit 42 is, for example, a microcomputer having a hardware processor such as a CPU. The braking control unit 42 controls the braking unit 41 based on instructions from the driving support device 20 to control the deceleration of the vehicle 10. The braking unit sensor 43 is, for example, a position sensor and detects the position of the brake pedal included in the braking unit 41. The braking unit sensor 43 outputs the detected position of the brake pedal to the in-vehicle network NT.

The acceleration system 50 includes an acceleration unit 51, an acceleration control unit 52, and an acceleration unit sensor 53 and controls the acceleration of the vehicle 10.

The acceleration unit 51 is an apparatus including, for example, an accelerator pedal and accelerates the vehicle 10. The acceleration control unit 52 is, for example, a microcomputer having a hardware processor such as a CPU. The acceleration control unit 52 controls the acceleration unit 51 based on instructions from the driving support device 20 to control the acceleration of the vehicle 10. The acceleration unit sensor 53 is, for example, a position sensor and detects the position of the accelerator pedal included in the acceleration unit 51. The acceleration unit sensor 53 outputs the detected position of the accelerator pedal to the in-vehicle network NT.

The steering system 60 includes a steering unit 61, a steering control unit 62, and a steering unit sensor 63 to control the travel direction of the vehicle 10.

The steering unit 61 is an apparatus including, for example, a handle or a steering wheel, and steers the steering wheels of the vehicle 10 to steer the travel direction of the vehicle 10. The steering control unit 62 is, for example, a microcomputer having a hardware processor such as a CPU. The steering control unit 62 controls the steering unit 61 based on instructions from the driving support device 20 to control the travel direction of the vehicle 10. The steering unit sensor 63 is an angle sensor including, for example, a Hall element, and detects a steering angle, which is a rotational angle of the steering unit 61. The steering unit sensor 63 outputs the detected steering angle of the steering unit 61 to the in-vehicle network NT.

The transmission system 70 includes a transmission unit 71, a transmission control unit 72, and a transmission unit sensor 73 and controls the gear ratio of the vehicle 10.

The transmission unit 71 is an apparatus including, for example, a shift lever and changes the gear ratio of the vehicle 10. The transmission control unit 72 is, for example, a microcomputer having a hardware processor such as a CPU. The transmission control unit 72 controls the transmission unit 71 based on instructions from the driving support device 20 to control the gear ratio of the vehicle 10. The transmission unit sensor 73 is, for example, a position sensor and detects the position of the shift lever included in the transmission unit 71. The transmission unit sensor 73 outputs the detected position of the shift lever to the in-vehicle network NT.

The vehicle speed sensor 83 has, for example, a Hall element provided near the wheel 13 of the vehicle 10 and detects the rotation amount or the rotation number per unit time of the wheel 13. The vehicle speed sensor 83 outputs a wheel speed pulse count indicating the detected rotation amount or rotation number to the in-vehicle network NT as a sensor value for calculating the speed (vehicle speed) of the vehicle 10. The driving support device 20 can calculate the speed, the movement amount, and the like of the vehicle 10 based on the sensor value acquired from the vehicle speed sensor 83.

The mirror drive unit 90 as an opening-and-closing control unit is, for example, an actuator or the like for driving the side mirrors 15. The actuator of the mirror drive unit 90 is activated to open and close the side mirrors 15.

An open position of the side mirrors 15 is a use position of the side mirrors 15 enabling the driver or the like of the vehicle 10 to visually check the rear. Among the taken images by the imaging units 16 provided in the side mirrors 15, images taken when the side mirrors 15 are in the open position are used for the driving support or the like for the vehicle 10 as indicating the surrounding information of the vehicle 10.

A closed position of the side mirrors 15 is a retracted position of the side mirrors 15 when the vehicle 10 has finished traveling and is at a stop. When the side mirrors 15 are in the closed position, the taken images by the imaging units 16 provided in the side mirrors 15 are not referred to in the driving support or the like, or imaging by the imaging units 16 is not performed in the first place.

The monitor device 30 is provided on a dashboard or the like in the vehicle cabin of the vehicle 10 and has the display unit 31 and an input unit 32.

The display unit 31 is, for example, a display apparatus such as a liquid crystal display (LCD) or an organic electroluminescent display (OELD). The display unit 31 displays, for example, images based on image data transmitted by the driving support device 20, an image receiving an operation instruction to instruct switching between automatic driving and manual driving, and the like.

The input unit 32 is, for example, a touch panel provided on a display screen of the display unit 31. The input unit 32 is configured to enable contents displayed on the display screen by the display unit 31 to be transparent. With this configuration, the input unit 32 enables the occupants to visually check the display contents of the display unit 31.

The input unit 32 receives an instruction input by the occupants by touching a position corresponding to the display contents of the display unit 31 and transmits it to the driving support device 20 via the in-vehicle network NT. The input unit 32 is not limited to the touch panel and may also be a pushbutton type hard switch or the like.

Figure 3:
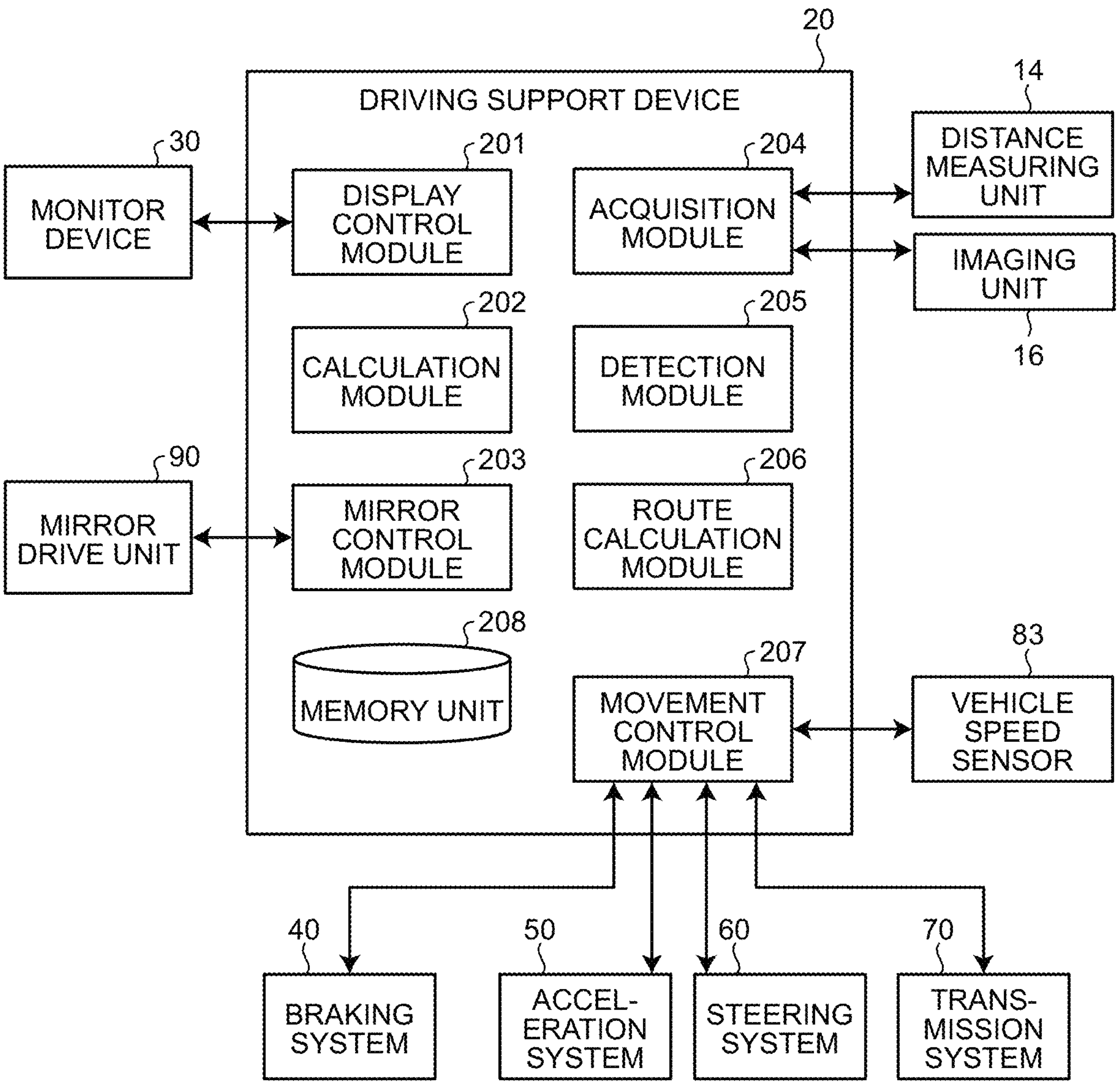
FIG. 3 is a block diagram of an example of a functional configuration of the driving support device according to the embodiment.

FIG. 3 is a block diagram of an example of a functional configuration of the driving support device 20 according to the embodiment. As illustrated in FIG. 3, the driving support device 20 includes a display control module 201, a calculation module 202, a mirror control module 203, an acquisition module 204, a detection module 205, a route calculation module 206, a movement control module 207, and a memory unit 208 as functional units.

These functional units are implemented by, for example, reading a computer program stored in a storage device such as the ROM 25 and executing it by the CPU 21 described above. Alternatively, these functional units are implemented by the display control circuit 23, the SSD 24, the ROM 25, the RAM 26, and the like operating under the control of the CPU 21 complying with a computer program.

Part or whole of these functional units may be configured by hardware such as circuitry including an application specific integrated circuit (ASIC).

The acquisition module 204 acquires sound wave transmission/reception information and taken images around the vehicle 10 from the distance measuring unit 14 and the imaging unit 16, respectively, as the surrounding information of the vehicle 10.

The detection module 205 detects obstacles, parking sections, parking areas, and the like around the vehicle 10 based on the surrounding information acquired by the acquisition module 204.

The obstacles are, for example, various objects such as other vehicles, walls, pillars, fences, protrusions, steps, and wheel stoppers. The obstacles could be, for example, people or the like walking in a parking lot.

The parking sections are areas provided for parking the vehicle 10 and sectioned by, for example, sectioning lines, borders, straight lines, strips, steps, or the like. The parking areas are parking sections in which the vehicle 10 can be parked, that is, parking sections in which there are no obstacles such as other vehicles that would interfere with the parking of the vehicle 10. The sectioning lines, borders, straight lines, strips, steps, and the like are examples of objects indicating the parking area and are targets when the vehicle 10 is caused to enter the parking area or caused to exit the parking area when the driving support device 20 supports entry and exit of the vehicle 10 to and from the parking area.

Upon occurrence of an instruction to start driving support from the driver or the like of the vehicle 10, the detection module 205 detects the presence or absence of obstacles, the distance from the vehicle 10 to the obstacles, and the like based on, for example, detection results of the distance measuring units 14. The detection module 205 detects the presence or absence of obstacles and parking sections, as well as their positions (orientations) with respect to the vehicle 10 and their shape, size, height, and the like by, for example, image processing based on images taken by the imaging units 16.

By combining these detection results, the detection module 205 extracts information such as whether there are obstacles around the vehicle 10, whether the obstacles could interfere with the travel of the vehicle 10, whether there is a parking section around the vehicle 10, and whether the vehicle 10 can be parked in the parking section, that is, whether the parking section can be used as the parking area.

The route calculation module 206 calculates a target position to which the vehicle 10 is guided based on a detection result by the detection module 205 and calculates a moving route to move the vehicle 10 to the target position.

When the vehicle 10 is to be parked (caused to enter), the parking area detected by the detection module 205 is the target position. When the vehicle 10 is caused to exit, the target position is a certain location at which the vehicle 10 can safely start traveling thereafter, such as on an aisle provided between a plurality of parking sections.

The route calculation module 206 may also calculate a turnaround as needed. One or more turnarounds are set when parking or exit is difficult by one-time reversing, advancing, or the like.

The route calculation module 206 calculates the moving route of the vehicle 10 from the current position of the vehicle 10 to the target position in order to guide the vehicle 10 to the target position calculated as described above. The moving route may also include turnarounds as described above. In this case, the route calculation module 206 calculates the moving route from the current position of the vehicle 10, through the turnarounds, to the target position.

Thus, the route calculation module 206 calculates the moving route for, for example, parking such as reversing parking or advancing parking. The route calculation module 206 also calculates the moving route for, for example, exit such as advancing exit or reversing exit.

The movement control module 207 controls the parts of the vehicle 10 to move the vehicle 10 during the driving support for the vehicle 10. Specifically, the movement control module 207 controls all or part of the braking system 40, the acceleration system 50, the steering system 60, and the transmission system 70 to move the vehicle 10 to the target position in accordance with the moving route. In this process, the movement control module 207 moves the vehicle 10 while receiving feedback from the sensors such as the braking unit sensor 43, the acceleration unit sensor 53, the steering unit sensor 63, the transmission unit sensor 73, and the vehicle speed sensor 83.

Even after the movement control module 207 starts to move the vehicle 10, the detection module 205 continues acquisition of the surrounding information from the distance measuring units 14 and the imaging units 16. This causes the movement control module 207 to temporarily stop the vehicle 10 when an obstacle is detected at a position hindering the vehicle 10 from moving on the moving route during the movement of the vehicle 10 along the moving route.

The route calculation module 206 recalculates the moving route as appropriate based on the detection result by the detection module 205. Once the moving route is recalculated, the movement control module 207 continues to move the vehicle 10 so as to fine-tune the position of the vehicle 10 accordingly.

The display control module 201 generates contents to be displayed on the display unit 31 of the monitor device 30 and causes the display unit 31 to display them. That is, the display control module 201 causes the display unit 31 to display, for example, a notification screen for the parking area in which the vehicle 10 can be parked having been detected, a selection screen for start, interruption, discontinuation, or the like of the driving support, a surrounding image of the vehicle 10 during the driving support, and the like.

When performing, for example, the parking support to park the vehicle 10 in a certain parking area, the calculation module 202 determines to close the side mirrors 15 by the mirror control module 203 at a certain position in front of the parking area when the width of the frontage of the parking area, which is an entrance for the vehicle 10, is a certain threshold or less.

The calculation module 202 also sets a position in front of the parking area, the position being obtained from the vehicle speed of the vehicle 10 moving under the control of the movement control module 207 and the time required to close the side mirrors 15, as a closing starting position for the side mirrors 15.

Upon reception of an instruction from the calculation module 202 during the driving support such as the parking support, the mirror control module 203 activates the mirror drive unit 90 to close the side mirrors 15. This prevents contact of the side mirrors 15 with, for example, neighboring parked vehicles or the like when the frontage of the parking area is narrow.

The memory unit 208 stores therein, for example, a computer program to be executed by the CPU 21 of the driving support device 20, various control parameters necessary for the operation of the driving support device 20, and the like. The memory unit 208 also stores therein, for example, specifications of the actuator of the mirror drive unit 90 and the like, as well as data such as the time required to close the side mirrors 15 and a vehicle speed set value of the vehicle 10 during the parking support. The memory unit 208 also stores therein data on a predicted moving distance predicted for the vehicle 10 to move from start of closing to completion of closing of the side mirrors 15. The predicted moving distance is a distance determined from the vehicle speed of the vehicle 10 during the parking support and the time required to close the side mirrors 15.

Operation Examples of Driving Support Device

The following describes operation examples of the driving support device 20 of the embodiment using FIG. 4 to FIG. 10.

FIG. 4 to FIG. 8 are schematic diagrams illustrating an example of the operation of the parking support by the driving support device 20 according to the embodiment. FIG. 4 to FIG. 8 illustrate a case in which the vehicle 10 performs reversing parking.

Figure 4:
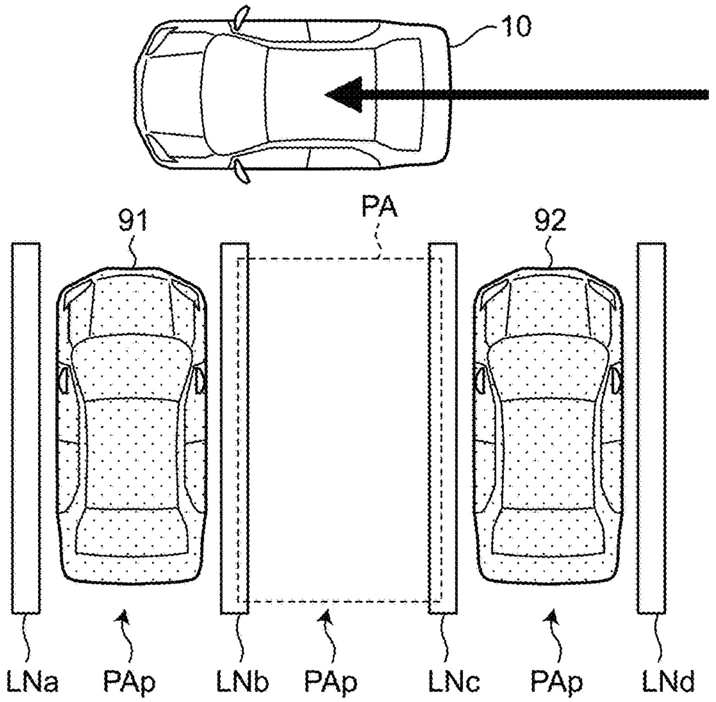
FIG. 4 is a schematic diagram illustrating an example of an operation of parking support by the driving support device according to the embodiment.

As illustrated in FIG. 4, it is assumed that one parking section PAp is vacant between parking sections PAp in which other vehicles 91 and 92 are parked in a parking lot or the like including a plurality of parking sections PAp in a row.

In the example in FIG. 4, it is assumed that each parking section PAp is sectioned by straight partition lines LNa, LNb, LNc, LNd . . . Out of these partition lines LNa, LNb, LNc, LNd . . . , the parking section PAp that is vacant and the parking section PAp in which the vehicle 91 is parked are partitioned by the partition line LNb. The parking section PAp that is vacant and the parking section PAp in which the vehicle 92 is parked are partitioned by the partition line LNc. The other side of the parking section PAp in which the vehicle 91 is parked is partitioned by the partition line LNa, and the other side of the parking section PAp in which the vehicle 92 is parked is partitioned by the partition line LNd.

When the vehicle 10 is stopped at a certain position, such as when it is laid alongside the parking section PAp that is vacant, the detection module 205 of the driving support device 20 installed in the vehicle 10 detects, for example, this parking section PAp that is vacant as a parking area PA in which the vehicle 10 can be parked from among the parking sections PAp. The display control module 201 of the driving support device 20 causes the display unit 31 of the monitor device 30 to display the detected parking area PA.

When desiring parking in the parking area PA, the occupants of the vehicle 10, including the driver, get out of the vehicle 10 and then instruct the driving support device 20 to execute driving support from outside the vehicle 10 using, for example, a mobile terminal, a smart key attached to the vehicle 10, or the like. This starts the parking support for the vehicle 10 by the driving support device 20.

Figure 5:
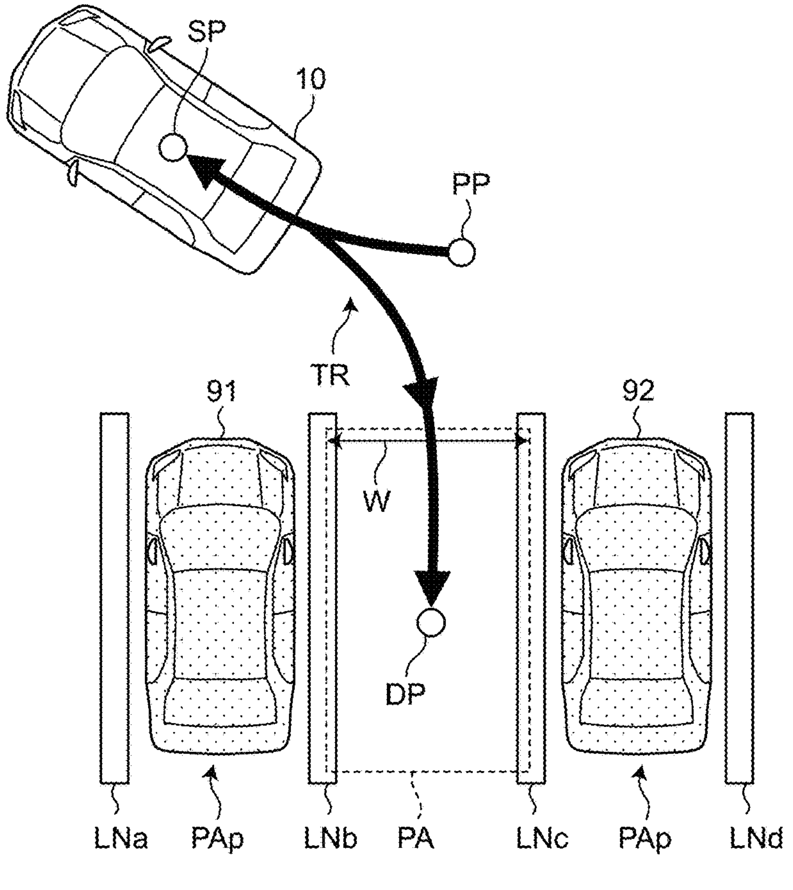
FIG. 5 is a schematic diagram illustrating the example of the operation of the parking support by the driving support device according to the embodiment.

As illustrated in FIG. 5, the route calculation module 206 of the driving support device 20 calculates a moving route TR. The moving route TR starts from, for example, a stop position PP of the vehicle 10 the occupants have gotten out of, through a turnaround SP, which is in an advancing direction of the vehicle 10, to a target position DP, which is in a reversing direction of the vehicle 10 at the turnaround SP and positioned within the parking area PA.

The movement control module 207 of the driving support device 20 starts to move the vehicle 10 on the moving route TR in accordance with a calculation result of the route calculation module 206. During this time, the driver can monitor the movement of the vehicle 10 and, if necessary, transmit an instruction to, for example, temporarily stop the vehicle 10 to the driving support device 20 from the mobile terminal, the smart key, or the like.

Meanwhile, when the parking support is started, the calculation module 202 of the driving support device 20 calculates whether a frontage width W of the parking area PA is a certain threshold or less, for example, in parallel with the calculation of the moving route TR by the route calculation module 206 and the like.

As described above, the frontage width W of the parking area PA is the part as the entrance to the parking area PA for the vehicle 10 and, in the example in FIG. 4, can be defined based on, for example, the partition lines LNb and LNc on both sides of the parking area PA in the width direction or the like.

That is, the frontage width W of the parking area PA can be, for example, the distance from the center position of the partition line LNb in the width direction to the center position of the partition line LNc in the width direction. Alternatively, the frontage width W of the parking area PA can be the distance between the inside of the partition lines LNb and LNc in the width direction, that is, between the ends on the side facing the parking area PA, the distance between the outside of the partition lines LNb and LNc in the width direction, that is, between the ends on the side facing outside the parking area PA, or the like.

The position of the frontage width W in the depth direction of the parking area PA can be determined based on the position of the front end of the vehicles 91 and 92 parked adjacent to both sides of the parking area PA, that is, the end position closer to the frontage width W. Alternatively, the position of the frontage width W in the depth direction of the parking area PA may be the position of the tip of an extension direction of the partition lines LNb and LNc, that is, the end position closer to the entrance of the vehicle 10. Alternatively, the position of the frontage width W in the depth direction of the parking area PA may be defined as the position between the front end of the vehicles 91 and 92 and the end of the partition lines LNb and LNc closer to the entrance or the like.

The frontage width W of the parking area PA can be set in various ways as described above so long as the distance between the neighboring vehicles 91 and 92 and the vehicle 10 can be sufficiently ensured and the vehicle 10 can be safely parked.

When the frontage width W of the parking area PA is the certain threshold or less, the calculation module 202 reads from the memory unit 208 the predicted moving distance predicted for the vehicle 10 to move from start of closing to completion of closing of the side mirrors 15 in order to close the side mirrors 15.

Figure 6A:
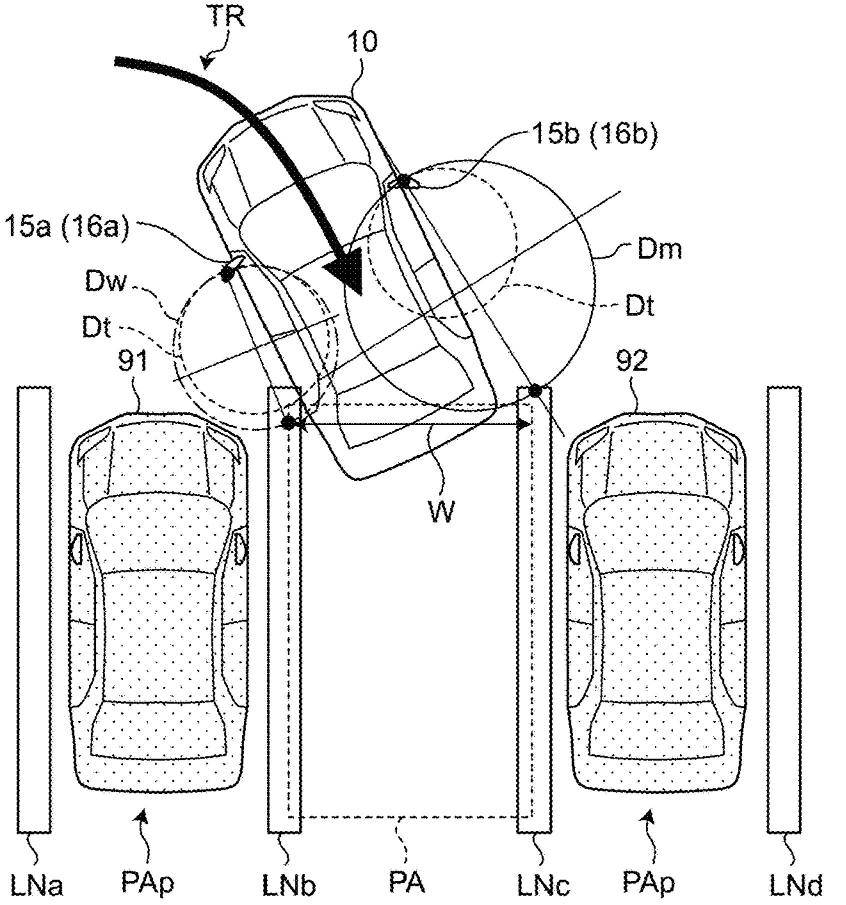
FIG. 6A is a schematic diagram illustrating the example of the operation of the parking support by the driving support device according to the embodiment.

As illustrated in FIG. 6A, the movement control module 207 is continuing to move the vehicle 10 on the moving route TR. Thus, the vehicle 10 reaches a position in front of the parking area PA at which the side mirrors 15 provided in the vehicle 10 can image the partition lines LNb and LNc indicating the ends of the parking area PA in the width direction by the imaging units 16 provided in the side mirrors 15 and at which the partition lines LNb and LNc can be detected by the detection module 205 from the taken images.

In the example in FIG. 6A, these partition lines LNb and LNc correspond to targets indicating the ends of the parking area PA in the width direction. The state in which the vehicle 10 has reached the position in front of the parking area PA refers to that at least half or more, preferably the majority portion or the whole of vehicle body 12 of the vehicle 10 is positioned outside the parking area PA on the moving route TR to the parking area PA.

Here, the vehicle 10 is attempting to perform reversing parking, and thus the imaging unit 16*a* provided in the side mirror 15*a* on the left side of the vehicle 10 becomes ready to image the partition line LNb at the left end of the parking area PA.

Lagging behind this, the imaging unit 16*b* provided in the side mirror 15*b* on the right side of the vehicle 10 becomes ready to image the partition line LNc at the right end of the parking area PA. In the example in FIG. 6A, the detection of the partition line LNc by the side mirror 15*b* lags behind the detection of the partition line LNb by the side mirror 15*a* because the vehicle 10 enters the parking area PA slightly inclined with respect to the partition lines LNb and LNc while turning from the turnaround SP set in front of and to the left of the parking area PA. In this case, for the same vehicle 10 position, the distance from the partition line LNc to the imaging unit 16*b* is farther than the distance from the partition line LNb to the imaging unit 16*a*.

Figure 6B:
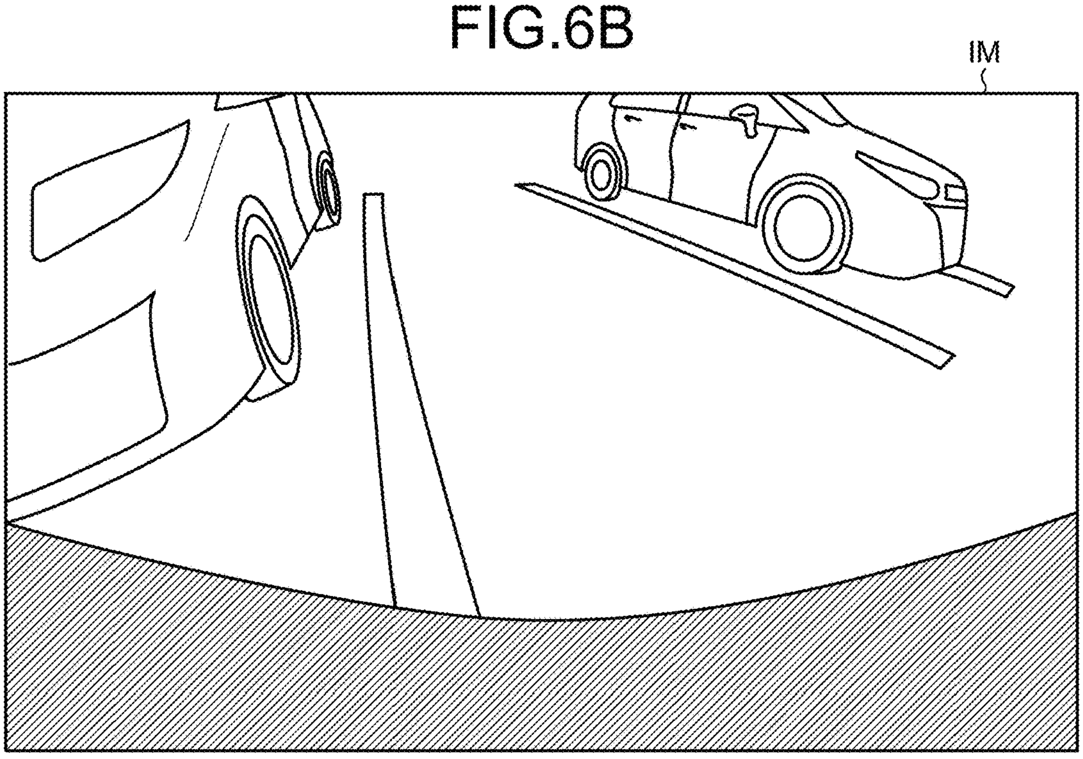
FIG. 6B is a schematic diagram illustrating the example of the operation of the parking support by the driving support device according to the embodiment.

In FIG. 6A, the distance from the partition line LNc to the imaging unit 16*b* at the vehicle 10 position at which the partition line LNc can be imaged by the imaging unit 16*b* and can be detected by the detection module 205 is indicated by the diameter of a circle Dm. For reference, FIG. 6B illustrates an example of an image IM taken by the imaging unit 16*d* provided at the rear end of the vehicle 10. The taken image by the imaging unit 16*d* at the rear end of the vehicle 10 is a left-right inverted image.

Further, in FIG. 6A, the distance from the side mirror 15*a* to the frontage width W of the parking area PA at the vehicle 10 position at which the imaging unit 16*b* can image the partition line LNc is indicated by the diameter of a circle Dw. The predicted moving distance of the vehicle 10 is indicated by the diameter of respective circles Dt starting from the side mirrors 15*a* and 15*b*. That is, when the vehicle 10 moves by the predicted moving distance, the side mirrors 15*a* and 15*b* will move within the ranges defined by the respective circles Dt.

In the example in FIG. 6A, the distance indicated by the diameter of the circle Dw from the side mirror 15*a* to the frontage width W of the parking area PA at the vehicle 10 position at which the imaging unit 16*b* can image the partition line LNc is longer than the predicted moving distance indicated by the diameter of the circle Dt starting from the side mirror 15*a*.

The distance from the side mirror 15*b* to the frontage width W of the parking area PA is farther than the distance from the side mirror 15*a* to the frontage width W of the parking area PA, and thus the distance from the side mirror 15*b* to the frontage width W of the parking area PA is also longer than the predicted moving distance calculated above.

According to the inventors of the present invention, the distance from the side mirror 15 closer to the frontage width W of the parking area PA to the frontage width W at the vehicle 10 position at which the imaging unit 16 provided in the side mirror 15 farther from the target indicating the width direction of the parking area PA, such as the partition line LN, can image the target has been estimated to be approximately equal to the predicted moving distance of the vehicle 10 calculated from the vehicle speed of the vehicle 10 and the closing time of the side mirror 15, and it has been confirmed that the greater or lesser of these distances entirely satisfies the requirement.

The calculation module 202 instructs the mirror control module 203 to start closing of the side mirrors 15*a* and 15*b* at the above arrival position of the vehicle 10 before the position of the vehicle 10 moving by the parking support has the distance from the side mirrors 15*a* and 15*b* to the frontage width W of the parking area PA equal to the predicted moving distance of the vehicle 10. More specifically, the closing starting position for the side mirrors 15*a* and 15*b* is set at a position at which, for example, the distance from the side mirrors 15*a* and 15*b* to the frontage width W of the parking area PA is at least the predicted moving distance of the vehicle 10 and a distance with which the side mirrors 15*a* and 15*b* can be fully closed safely without bringing them too close to the neighboring vehicle 91 or the like or more is left.

Figure 7:
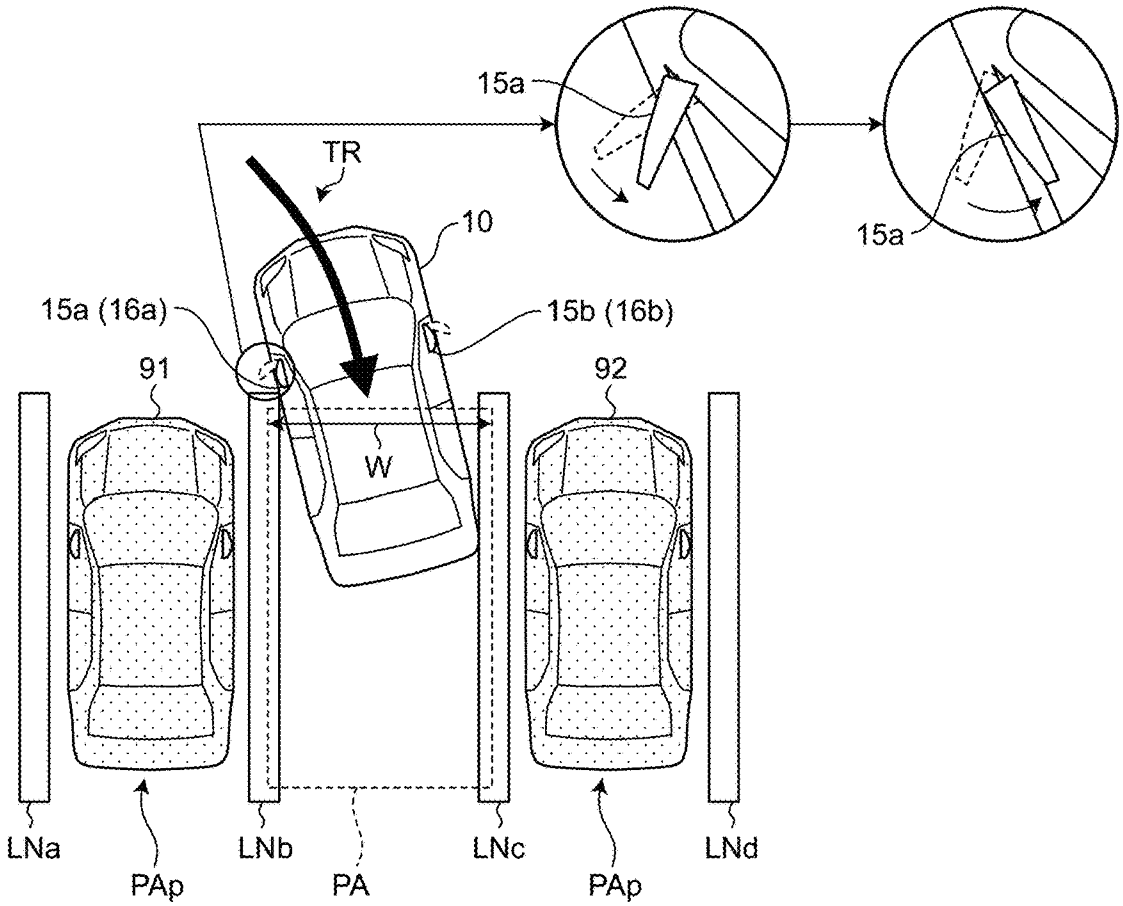
FIG. 7 is a schematic diagram illustrating the example of the operation of the parking support by the driving support device according to the embodiment.

As illustrated in FIG. 7, the mirror control module 203 of the driving support device 20 controls the mirror drive unit 90 in accordance with an instruction from the calculation module 202 to start closing of the side mirrors 15*a* and 15*b*. The movement control module 207 continues to move the vehicle 10 on the moving route TR even during that time.

As described above, when closing of the side mirrors 15*a* and 15*b* is started before the distance from the side mirrors 15*a* and 15*b* to the frontage width W of the parking area PA becomes equal to the predicted moving distance of the vehicle 10, even when the movement of the vehicle 10 continues while closing the side mirrors 15*a* and 15*b*, the side mirrors 15*a* and 15*b* can be fully closed, for example, before the side mirrors 15*a* and 15*b* reach the frontage width W of the parking area PA.

Meanwhile, the detection module 205 detects the targets indicating the width of the parking area PA in the left-right direction, such as the partition lines LNb and LNc imaged by the imaging units 16*a* and 16*b*, respectively, before starting closing of the side mirrors 15*a* and 15*b*. Based on these targets, the route calculation module 206 determines whether the entry position of the vehicle 10 with respect to the width direction of the parking area PA is appropriate.

If the position of the vehicle 10 is not appropriate, such as when it is inclined with respect to the width direction of the parking area PA, the route calculation module 206 recalculates the moving route TR from the current position of the vehicle 10 to the target position DP, and the movement control module 207 fine-tunes the position of the vehicle 10 along the newly obtained moving route TR.

Meanwhile, once closing of the side mirrors 15*a* and 15*b* is started, the route calculation module 206, the movement control module 207, and the like exclude the images from the imaging units 16*a* and 16*b* provided in the side mirrors 15*a* and 15*b* and continue control of the vehicle 10 exclusively based on the images from the imaging units 16*c* and 16*d* provided at the front and rear of the vehicle 10.

More specifically, as in the example in FIG. 7, when the vehicle 10 is performing reversing parking, the route calculation module 206, the movement control module 207, and the like fine-tune the front-rear position of the vehicle 10 in the depth direction of the parking area PA based on, for example, the image of the imaging unit 16*d* provided at the rear corresponding to the travel direction of the vehicle 10.

Figure 8:
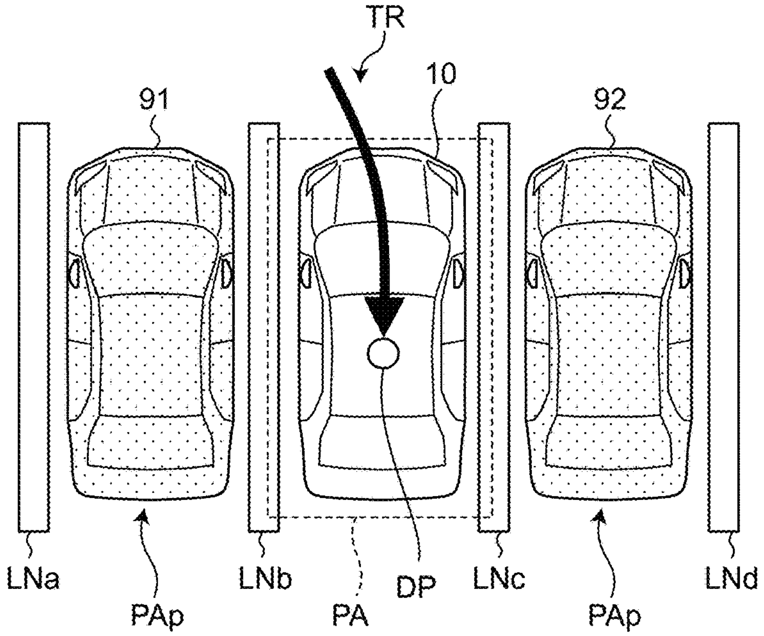
FIG. 8 is a schematic diagram illustrating the example of the operation of the parking support by the driving support device according to the embodiment.

As illustrated in FIG. 8, by the above control by the driving support device 20, the vehicle 10 is parked at the target position DP within the parking area PA, and the parking support by the driving support device 20 ends.

Figure 9:
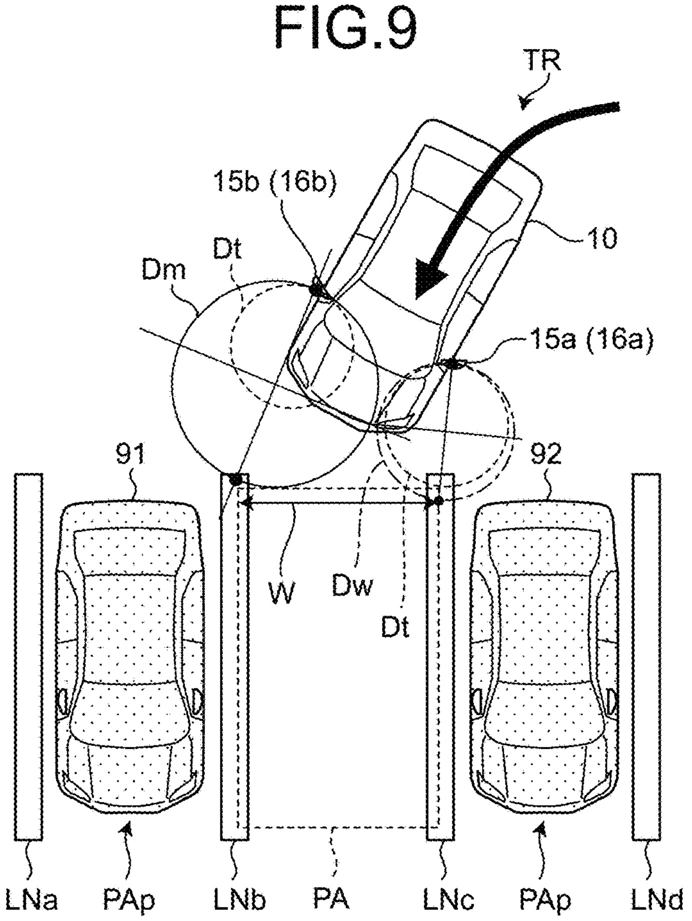
FIG. 9 is a schematic diagram illustrating another example of the operation of the parking support by the driving support device according to the embodiment.
Figure 10:
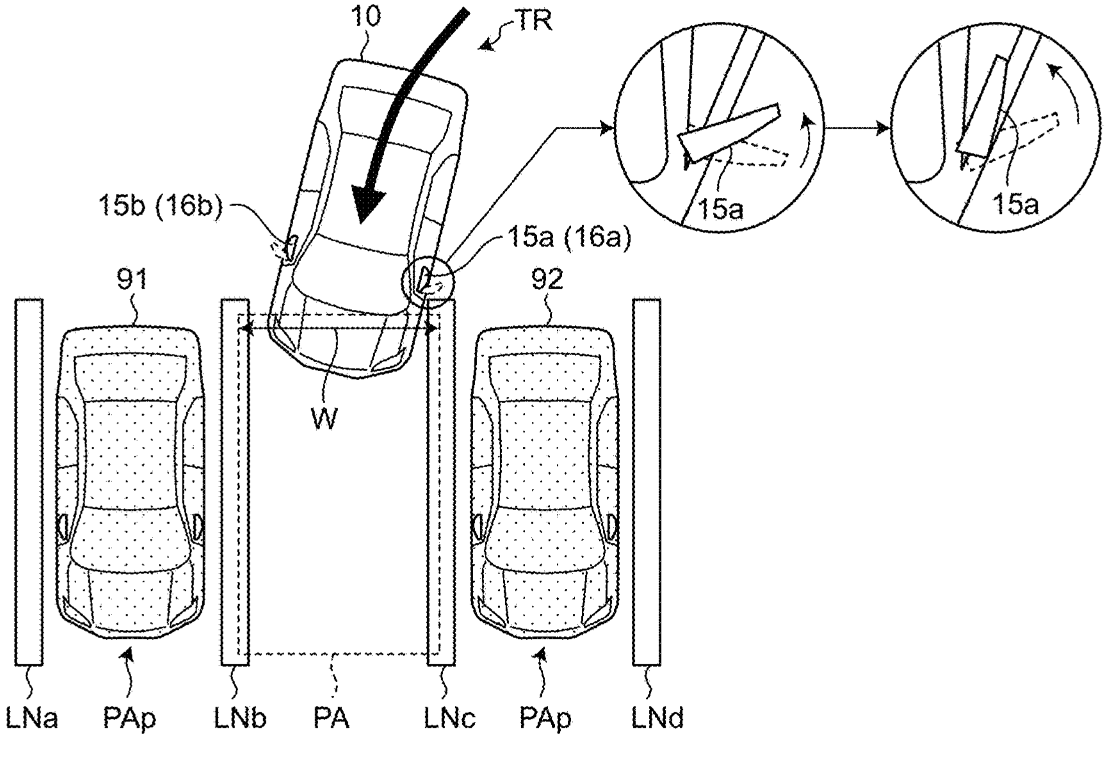
FIG. 10 is a schematic diagram illustrating the other example of the operation of the parking support by the driving support device according to the embodiment.

The following describes an example when the vehicle 10 performs advancing parking using FIG. 9 and FIG. 10.

FIG. 9 and FIG. 10 are schematic diagrams illustrating another example of the operation of the parking support by the driving support device 20 according to the embodiment. As in the example in FIG. 9 and FIG. 10, when the vehicle 10 performs advancing parking also, when the parking area PA is detected by the detection module 205, and the parking support is started by an instruction by the driver or the like, the route calculation module 206 calculates the moving route TR leading into the parking area PA in the advancing direction of the vehicle 10, and the movement control module 207 starts to move the vehicle 10 along the calculated moving route TR.

As illustrated in FIG. 9, the movement control module 207 continues to move the vehicle 10, thereby the vehicle 10 reaches a position at which the side mirrors 15 can image the partition lines LNb and LNc indicating the ends of the parking area PA in the width direction by the imaging units 16 and the partition lines LNb and LNc can be detected by the detection module 205.

In this process, the vehicle 10 is attempting to perform advancing parking, and thus the imaging unit 16*a* provided in the side mirror 15*a* on the left side of the vehicle 10 becomes ready to image the partition line LNc at the left end of the parking area PA as seen from the vehicle 10.

Lagging behind this, the imaging unit 16*b* provided in the side mirror 15*b* on the right side of the vehicle 10 becomes ready to image the partition line LNb at the right end of the parking area PA as seen from the vehicle 10. In the example in FIG. 9, the detection of the partition line LNb by the side mirror 15*b* lags behind the detection of the partition line LNc by the side mirror 15*a* because the vehicle 10 enters the parking area PA slightly inclined with respect to the partition lines LNb and LNc while turning from behind and to the left of the parking area PA. In this case, for the same vehicle 10 position, the distance from the partition line LNb to the imaging unit 16*b* is farther than the distance from the partition line LNc to the imaging unit 16*a*.

In FIG. 9 also, the distance from the partition line LNb to the imaging unit 16*b* at the vehicle 10 position at which the partition line LNb can be imaged by the imaging unit 16*b* and can be detected by the detection module 205 is indicated by the diameter of the circle Dm.

In the example in FIG. 9, the distance indicated by the diameter of the circle Dw from the side mirror 15*a* to the frontage width W of the parking area PA at the vehicle 10 position at which the imaging unit 16*b* can image the partition line LNb is longer than the predicted moving distance indicated by the diameter of the circle Dt starting from the side mirror 15*a*.

The distance from the side mirror 15*b* to the frontage width W of the parking area PA is farther than the distance from the side mirror 15*a* to the frontage width W of the parking area PA, and thus the distance from the side mirror 15*b* to the frontage width W of the parking area PA is also longer than the predicted moving distance.

The calculation module 202 instructs the mirror control module 203 to start closing of the side mirrors 15*a* and 15*b* at the above arrival position of the vehicle 10 before the position of the vehicle 10 moving by the parking support has the distance from the side mirrors 15*a* and 15*b* to the frontage width W of the parking area PA equal to the predicted moving distance of the vehicle 10.

As illustrated in FIG. 10, the mirror control module 203 of the driving support device 20 controls the mirror drive unit 90 in accordance with an instruction from the calculation module 202 to start closing of the side mirrors 15*a* and 15*b*. The movement control module 207 continues to move the vehicle 10 on the moving route TR even during that time. In this case also, the closing operation of the side mirrors 15*a* and 15*b* is completed, for example, before the side mirrors 15*a* and 15*b* reach the frontage width W of the parking area PA.

The route calculation module 206 refers to the targets such as the partition lines LNc and LNb imaged by the imaging units 16*a* and 16*b*, respectively, before starting closing of the side mirrors 15*a* and 15*b* and recalculates the moving route TR as needed, and the movement control module 207 fine-tunes the position of the vehicle 10 in the width direction of the parking area PA.

After starting closing of the side mirrors 15*a* and 15*b*, the images from the imaging units 16*a* and 16*b* provided in the side mirrors 15*a* and 15*b*, respectively, are excluded, and the control of the vehicle 10 is continued based on, for example, the image of the imaging unit 16*c* provided at the front, which corresponds to the travel direction of the vehicle 10.

With the above, the vehicle 10 is parked at the target position within the parking area PA, and the parking support by the driving support device 20 ends.

Processing Example by Driving Support Device

Figure 11:
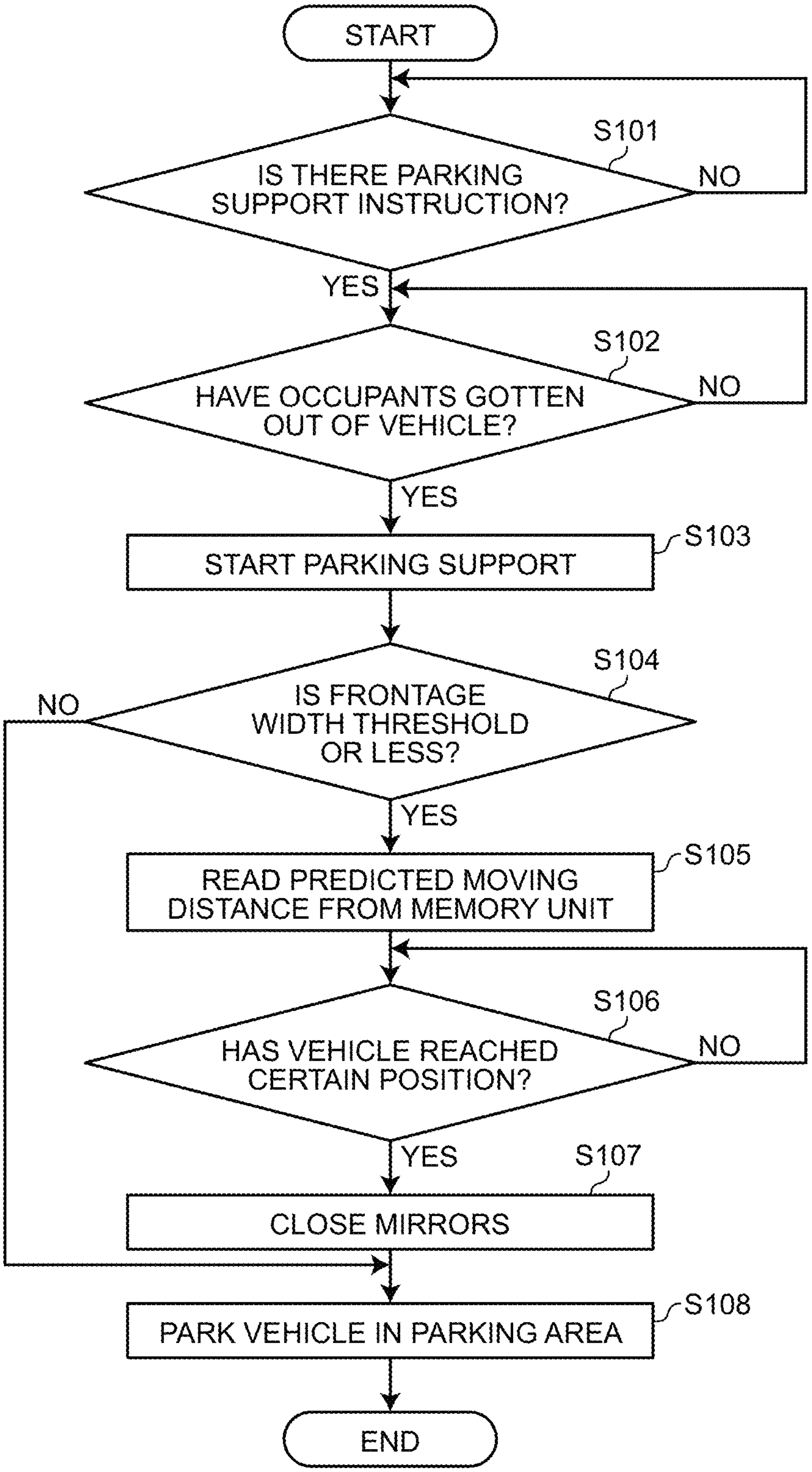
FIG. 11 is a flow diagram of an example of a procedure of driving support processing by the driving support device according to the embodiment.

The following describes an example of driving support processing by the driving support device 20 of the embodiment using FIG. 11. FIG. 11 is a flow diagram of an example of a procedure of the driving support processing by the driving support device 20 according to the embodiment.

As illustrated in FIG. 11, for example, after the detection module 205 detects the parking area PA, the driving support device 20 waits for an instruction to start parking support from the driver or the like who has gotten out of the vehicle 10 (Step S101).

Upon reception of the instruction to start parking support from the driver or the like (Yes at Step S101), after it is confirmed that the instruction is given after the occupants such as the driver have gotten out of the vehicle 10 (Yes at Step S102), parking support by the driving support device 20 is started (Step S103). The driving support device 20 waits until the instruction to start parking support is received and until the occupants get out of the vehicle 10 (No at Steps S101 and S102).

After start of the parking support, the route calculation module 206 calculates the moving route TR from the stop position of the vehicle 10 at that point in time to the target position DP within the parking area PA, and the movement control module 207 starts to move the vehicle 10 in accordance with the calculated moving route TR.

The calculation module 202 determines whether the frontage width W of the parking area PA detected by the detection module 205 is the certain threshold or less (Step S104). If the frontage width W of the parking area PA is greater than the certain threshold (No at Step S104), the parking support is continued without the calculation module 202 instructing closing of the side mirrors 15.

If the frontage width W of the parking area PA is the certain threshold or less (Yes at Step S104), the calculation module 202 reads from the memory unit 208 the predicted moving distance of the vehicle 10 from start of closing to completion of closing of the side mirrors 15 (Step S105).

The calculation module 202 determines whether the vehicle 10 has reached a certain position before the distance between the side mirrors 15*a* and 15*b* on both the left and right sides and the frontage width W of the parking area PA becomes equal to the predicted moving distance (Step S106). The calculation module 202 waits until the vehicle 10 reaches the above position (No at Step S106).

When the vehicle 10 reaches the above position (Yes at Step S106), the calculation module 202 gives an instruction to the mirror control module 203 at that position, and the mirror control module 203 starts closing of the side mirrors 15*a* and 15*b* (Step S107). This completes the closing operation of the side mirrors 15*a* and 15*b*, for example, before the side mirrors 15*a* and 15*b* reach the frontage width W of the parking area PA.

The movement control module 207 continues control of the vehicle 10 during and even after the closing operation of the side mirrors 15*a* and 15*b* and parks the vehicle 10 at the target position DP within the parking area PA (Step S108).

The above ends the driving support processing by the driving support device 20 of the embodiment.

Summary

A driving support device performs driving support for a vehicle based on surrounding information of the vehicle from various sensors such as distance measuring units and imaging units. According to parking support by the driving support device, parking in a very narrow parking area can be easily performed. However, when attempting parking in a parking area with a narrow width, side mirrors provided in the vehicle may interfere with neighboring parked vehicles or the like.

The technique of Japanese Patent Application Laid-open No. 2022-042212 described above determines whether the width of the parking area is a certain threshold or less in the straight route as the final stage of entry and closes the side mirrors if the width is the threshold or less. However, even if closing of the side mirrors is started in the straight route the as the final stage of entry, the side mirrors may come too close to neighboring parked vehicles or the like before the side mirrors are fully closed, causing the side mirrors to make contact. In addition, depending on the moving route of the vehicle to the parking area, the route is not necessarily a straight route in the final stage of entry, making it difficult to apply the above technique to such a case.

According to the driving support device 20 of the embodiment, when the frontage width W of the parking area PA is the certain threshold or less, the mirror control module 203 starts closing of the side mirrors 15 at a position in front of the parking area PA based on the vehicle 10, the position being obtained by the vehicle speed of the vehicle 10 and the time required to close the side mirrors 15.

Thus, closing of the side mirrors 15 is started at the position in front of the parking area PA, and thus the closing operation of the side mirrors 15 can be completed, for example, before the side mirrors 15 reach the frontage width W of the parking area PA. Thus, the side mirrors 15 can be safely closed while preventing contact with neighboring vehicles or the like.

According to the driving support device 20 of the embodiment, closing of the side mirrors 15 is started before the position of the vehicle 10 moving by the parking support has the distance from the side mirrors 15 to the frontage width W of the parking area PA equal to the predicted moving distance.

Thus, closing of the side mirrors 15 is started with a distance for the vehicle 10 to move from start of closing to completion of closing of the side mirrors 15 left, from the side mirrors 15 to the frontage width W of the parking area PA, and thus the closing operation of the side mirrors 15 can be completed more surely, for example, before the side mirrors 15 reach the frontage width W of the parking area PA.

According to the driving support device 20 of the embodiment, the parking position of the vehicle 10 in the width direction of the parking area PA is adjusted based on the targets such as the partition lines LNb and LNc detected by the imaging units 16*a* and 16*b* of the side mirrors 15 before starting closing of the side mirrors 15.

Thus, until just before starting closing of the side mirrors 15, the targets such as the partition lines LNb and LNc indicating the ends of the parking area PA in the width direction are captured by the imaging units 16*a* and 16*b* of the side mirrors 15, and the parking position of the vehicle 10 is adjusted based on their detection results, and thus the accuracy of the parking support by the driving support device 20 can be enhanced.

According to the driving support device 20 of the embodiment, after closing of the side mirrors 15 is started, the moving route of the vehicle 10 is adjusted based on the surrounding information collected by the imaging units 16*c* and 16*d* provided in the travel direction of the vehicle 10 among the imaging units 16*a* to 16*d*.

Thus, after closing of the side mirrors 15 is started and the vehicle 10 starts to enter the parking area PA, control of the vehicle 10 is performed exclusively using the imaging units 16*c* and 16*d* in the travel direction of the vehicle 10, thereby, for example, making it easier to grasp the position of the vehicle 10 in the depth direction of the parking area PA and further enhancing the accuracy of the parking support by the driving support device 20.

According to the driving support device 20 of the embodiment, when the vehicle 10 reaches a position at which both the imaging units 16*a* and 16*b* on both sides of the vehicle 10 can each detect either of the above targets on both sides of the parking area PA in the width direction, closing of the side mirrors 15 is started.

In such a case as when the entry route of the vehicle 10 to the parking area PA is inclined, there may be a deviation in the position at which the imaging units 16*a* and 16*b* on both sides of the vehicle 10 can each image either of the targets. By waiting until both the imaging units 16*a* and 16*b* can each image either of the targets, the position of the vehicle 10 in the width direction of the parking area PA can be grasped more accurately, and the accuracy of the parking support by the driving support device 20 can be further enhanced.

In the embodiment described above, the driving support device 20 is installed in the vehicle 10, but the driving support device 20 is not necessarily required to be installed in the vehicle 10. For example, a driving support device at a position remote from a vehicle may acquire the surrounding information of the vehicle from various sensors to remotely perform driving support for the vehicle.

In the embodiment described above, the rear side checking parts for checking the rear side of the vehicle 10 are the side mirrors 15. However, the configuration to which the embodiment described above can be applied is not limited to the side mirrors 15. For example, the rear side checking parts may be retractable cameras or the like provided in the left and right doors at the front of the vehicle body 12 or the like. In this case, the driver can check taken images of the rear side from the retractable cameras on a monitor or the like installed in the vehicle cabin.

According to the embodiment described above, in the driving support device, the calculation module is configured to: calculate a predicted moving distance predicted for the vehicle to move from start of closing to completion of closing of the rear side checking parts based on the vehicle speed of the vehicle and the closing time of the rear side checking parts; and start closing of the rear side checking parts before a position of the vehicle moving by the parking support has a distance from the rear side checking parts to the frontage equal to the predicted moving distance. According to this configuration, the closing operation of the rear side checking parts can be completed more surely before the rear side checking parts reach the frontage of the parking area.

Moreover, the driving support device further includes a movement control module configured to move the vehicle to the parking area. The movement control module, before starting closing of the rear side checking parts, is configured to adjust a parking position of the vehicle in a width direction of the parking area based on an object indicating the parking area detected by the first sensors. According to this configuration, because the parking position of the vehicle is adjusted based on detection results of the first sensors before start of closing of the rear side checking parts, the accuracy of the parking support by the driving support device can be further enhanced.

Moreover, in the driving support device, the object indicating the parking area includes targets indicating ends of the parking area in the width direction. According to this configuration, because the parking position of the vehicle is adjusted targeting the objects that are easy to detect from the first sensors provided in the rear-side checking parts, the accuracy of the parking support by the driving support device can be further enhanced.

Moreover, in the driving support device, the movement control module, after starting closing of the rear side checking parts, is configured to adjust a moving route of the vehicle based on the surrounding information collected by second sensors provided in a travel direction of the vehicle out of the plurality of sensors. According to this configuration, for example, the vehicle position in the depth direction of the parking area can be easily grasped, and the accuracy of the parking support by the driving support device can be further enhanced.

Moreover, in the driving support device, the movement control module is configured to start to move the vehicle after occupants of the vehicle get out of the vehicle. According to this configuration, because remote parking with a driver and the like getting out of the vehicle is possible and there is no need for the passengers to get in and out of the vehicle after parking, the vehicle can be parked in a very narrow parking area.

Moreover, in the driving support device, the movement control module is configured to advance or reverse the vehicle to cause the vehicle to enter the parking area from the frontage. Thus, the various configurations described above can be applied to both advancing parking and reversing parking.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A driving support device that performs, based on surrounding information collected by a plurality of sensors provided in a vehicle, parking support for the vehicle, the driving support device comprising:

an opening-and-closing control unit configured to open and close rear side checking parts provided with first sensors out of the plurality of sensors; and a calculation module, when the parking support is performed, configured to determine whether the rear side checking parts are to be closed based on a size of a width of a frontage of a parking area for the vehicle to enter the parking area, the calculation module, when the width of the frontage is a certain threshold or less, being configured to start closing of the rear side checking parts by the opening-and-closing control unit at a position in front of the parking area based on the vehicle, the position being set based on a distance obtained from a vehicle speed of the vehicle and a time required to close the rear side checking parts, wherein the calculation module is further configured to calculate a predicted moving distance predicted for the vehicle to move from start of closing to completion of closing of the rear side checking parts based on the vehicle speed of the vehicle and the closing time of the rear side checking parts, and while the vehicle is moved under the control of the parking support, start closing of the rear side checking parts before a position of the vehicle moving by the parking support has a distance from the rear side checking parts to the frontage equal to the predicted moving distance.

2. The driving support device according to claim 1, further comprising a movement control module configured to move the vehicle to the parking area, wherein the movement control module, before starting closing of the rear side checking parts, is configured to adjust a parking position of the vehicle in a width direction of the parking area based on an object indicating the parking area detected by the first sensors.

3. The driving support device according to claim 2, wherein the object indicating the parking area includes targets indicating ends of the parking area in the width direction.

4. The driving support device according to claim 2, wherein the movement control module, after starting closing of the rear side checking parts, is configured to adjust a moving route of the vehicle based on the surrounding information collected by second sensors provided in a travel direction of the vehicle out of the plurality of sensors.

5. The driving support device according to claim 2, wherein the movement control module is configured to start to move the vehicle after occupants of the vehicle get out of the vehicle.

6. The driving support device according to claim 2, wherein the movement control module is configured to advance or reverse the vehicle to cause the vehicle to enter the parking area from the frontage.

* * * * *